Figure 1:
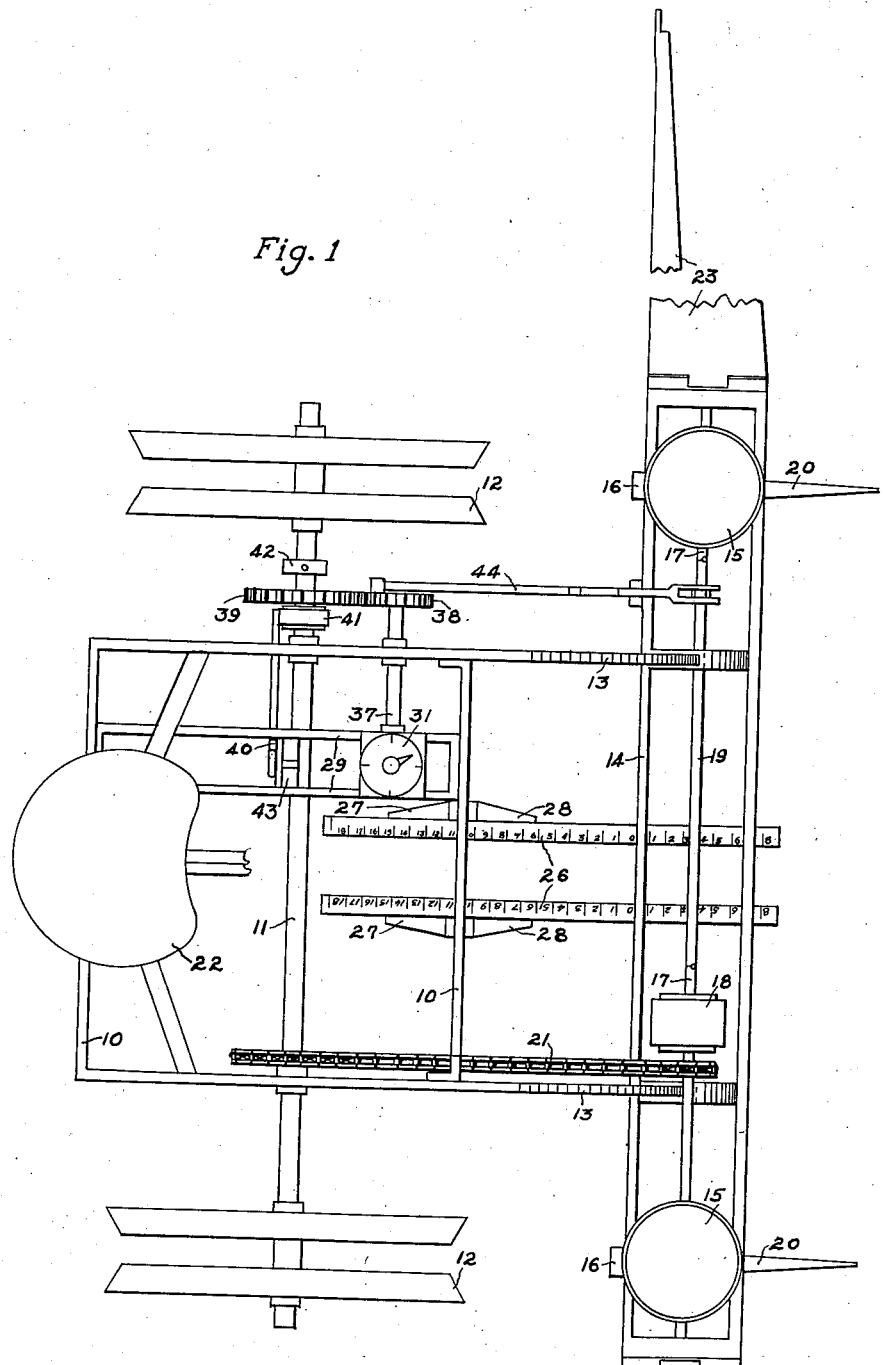

Dec. 2, 1941.　　　F. F. ARENZ　　　2,264,963
CHECKROW PLANTER
Filed Sept. 7, 1940　　　2 Sheets-Sheet 1

INVENTOR
FRANCIS F. ARENZ
BY
Alois W. Graf
ATTORNEY

Dec. 2, 1941.                F. F. ARENZ                2,264,963
                          CHECKROW PLANTER
                        Filed Sept. 7, 1940          2 Sheets-Sheet 2

INVENTOR
FRANCIS F. ARENZ
BY Alois W Graf
ATTORNEY

Patented Dec. 2, 1941

2,264,963

UNITED STATES PATENT OFFICE 2,264,963

CHECKROW PLANTER

Francis F. Arenz, South Bend, Ind., assignor to Auto-Dial Planter Co., Inc., Mattoon, Ill., a corporation of Illinois Application September 7, 1940, Serial No. 355,724

7 Claims. (Cl. 111—16)

My invention relates to check row planters and more particularly to that type of planter which does not use a check wire or cord.

Heretofore numerous check row planters have been devised for planting without the use of check cords or wires, but generally these planters have not found favor with farmers because the operation was not sufficiently simplified. Some of these planters required the operator to drive a stake in the ground each time that a row or pair of rows had been planted. After driving the stake the planter was turned about for the return trip and the operator would again dismount to line up the stake with a scale or pair of scales. After observing the indicia of the scales the planter had to be adjusted, and then the operator could proceed to the other end of the field where a similar series of steps in operation would be performed.

While in some planters it was unnecessary to drive and gather up stakes, but it still was necessary to have guide marks at the ends of the field. In still other planters, some other reference point was used, but generally it has been necessary to dismount from the planter in order to line up the planter for the return trip. The inconvenience of so many operations and the necessity of dismounting from and remounting the planter contributed to the failure of such prior devices to find public favor. Then too, many such arrangements did not offer any economic advantage over existing types of planters.

It is, therefore, an object of my invention to provide an improved check row planter which will overcome many of the disadvantages of the arrangements found in the prior art, and which will be simple in operation, and economical to manufacture.

Another object of my invention is to provide an arrangement whereby existing planters may be readily converted, or where incorporated at the factory a minimum number of changes will be required to change over the manufacturing assembly line to my improved type of planter.

Still another object of my invention is to provide an improved check row planter with a simple, positive operating mechanism for intermittently actuating the seed trip bar of the planter irrespective of the depth at which the planting is to take place.

In accordance with my invention I obtain these and other advantages by utilizing a marker placed substantially in alignment with the seed boots for indicating the travel of the machine before disengaging the mechanism for a return trip. The mark thus made is brought between two parallel horizontal scales located closely adjacent the ground and just ahead of the operator's seat so as to be readily observed without dismounting. An indicator mechanism is also provided which shows the distance traveled from the last operation of the seed trip bar or the last hill of seed such as corn. When the parallel scales have been read, this latter mechanism is adjusted and the mechanism is re-engaged for the return trip.

Figure 3:
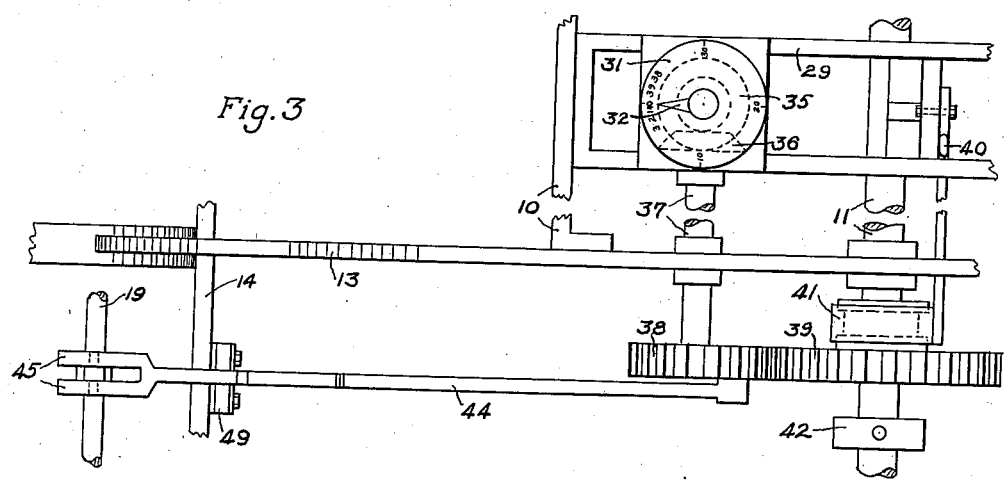
Figure 2:
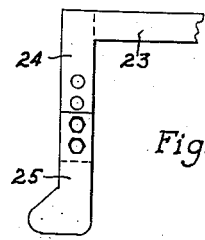
Figure 4:
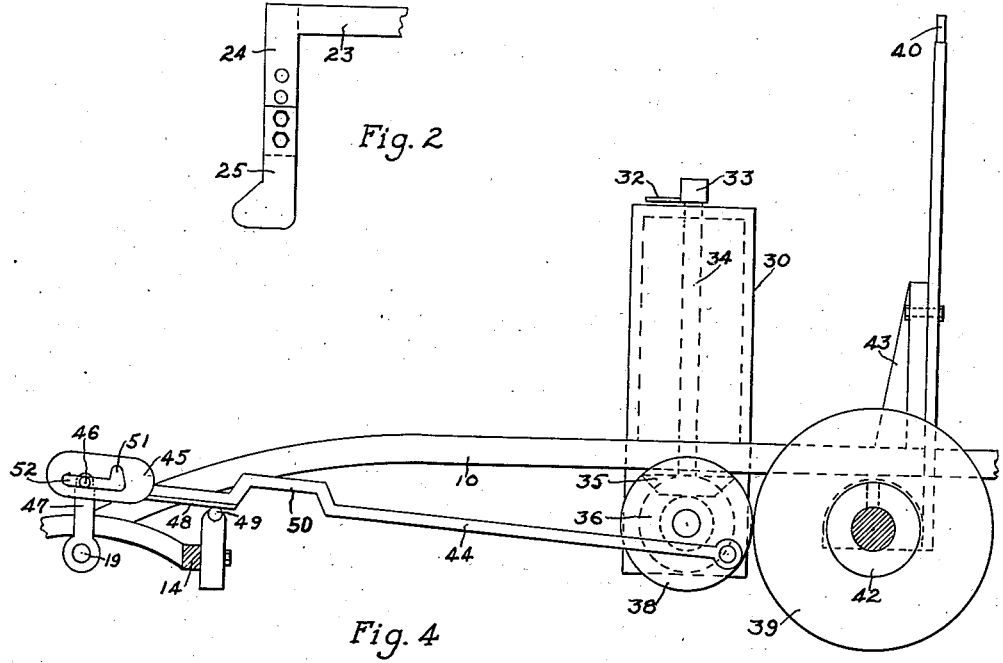

The novel features which I believe to be characteristic of my invention are set forth with particularity in the appended claims. My invention itself, however, both as to its organization and method of operation, together with further objects and advantages thereof, will be understood better by reference to the following description taken in connection with the accompanying drawings in which Fig. 1 is a top view of a check row planter embodying my invention; Fig. 2 is a detail view of the end portion of one of the marker bars; Fig. 3 is a top view of the detail of the dial distance recorder and the trip bar actuating mechanism; and Fig. 4 is a side view of the mechanism shown in Fig. 3.

Referring now more particularly to Fig. 1 of the drawings, there are shown such portions of a check row planter as are deemed necessary to illustrate the application of my invention to check row planters. For the sake of clarity in the drawings and the description certain portions of the planter have been omitted. In Fig. 1 there is shown a planter frame 10 supported upon an axle 11 which is provided with a pair of wheels 12. Suspended pivotally from lateral extensions 13 of the main frame is a transversely arranged subframe 14. This subframe 14 carries a pair of seed hoppers 15; a pair of seed boots 16, the rear portions of which are visible in this figure; a seed plate actuating shaft 17; a gear box 18; a seed trip shaft or bar 19; and a pair of furrowing means 20 such as runners or disks. Since the seed plate actuating shaft 17 is located substantially above the seed trip bar 19, a portion of the shaft 17 has been broken away.

As is apparent to those skilled in the art, the seed hoppers 15 are each fitted with a seed plate which selects the number of seeds to be planted in a single hill. This seed plate, not shown in the drawings, is actuated by a shaft 17 which is in turn actuated by power derived from the axle 11 by means of a chain 21 and suitable sprockets, and the gear box 18. The operation of the gear box which usually includes a clutch is controlled by a lever arrangement (not shown) which is located ahead of the operator's seat 22. The drawings furthermore do not disclose other operating levers such as are used to control the depth of the furrowing means 20 by changing the position of the transverse subframe 14. The seed plates drop seeds into a compartment in the seed boot 16 each time the trip bar 19 is actuated and concomitantly with this operation the seeds heretofore in the compartment are dropped into the ground between the furrowing means.

In accordance with my invention each end of the transverse subframe 14 is provided with a pivotally or hingedly mounted marker 23 which may be raised to an inoperative position by suitable cords or levers. Fig. 2 is a detail view of the end portion of the marker 23 which comprises an upper member 24 provided with a plurality of holes to which a second or lower member 25 may be secured in any one of a number of positions depending upon the soil and the depth at which planting is taking place. The bottom member 25 which marks the soil alongside of the planter is arranged to be in alignment with a line passing through the lower extremities of the seed tubes or boots 16. One of the markers 23 is retained in operative position until the end of the row is reached. The planter is then stopped and the marker is raised, the mechanism for actuating the seed trip bar is disengaged and the planter is brought into position for the return trip. Thus the marker 23 serves to indicate the end of operative travel of the planter in that row.

The planter is also provided with a pair of horizontal parallel scales 26 arranged longitudinally closely adjacent the ground beneath the planter. These scales are each provided with a reference point in alignment with the ends of the seed tubes or boots 16 and the lower end members 25 of the marker bars 23. The scales 26 which are supported from the frame 10 by pairs of support members 27 and 28 or other supporting means, extend ahead of and to the rear of the marker bars 23, and are provided with indicia or reference numerals progressively arranged in each direction to the ends of the scale. In the preferred embodiment shown the reference marks and numerals represent the number of inches from the reference point. In bringing the planter into position for the next row to be planted, the mark made in the soil by the terminal 25 of the marker 23 is brought between the scales 26 which are clearly visible from the operator's seat 22. Because the scales 26 are so closely adjacent to the ground no appreciable error will be introduced in reading them from the operator's seat 22 and thus it is unnecessary to dismount to obtain a reasonably accurate reading. The purpose of this reading of the scales 26 will subsequently become apparent, as well as the co-operation between the marker 23, the scales 26 and the remaining apparatus about to be described.

Reference may now be had to Figs. 3 and 4 in conjunction with Fig. 1 wherefrom it will be seen that a mechanism is provided for actuating the seed bar 19 and for indicating the distance travelled by the planter between actuations of the seed bar 19. This mechanism is mounted on the planter by means of an auxiliary frame 29 supported between two transverse members of the main frame 10. The auxiliary frame 29 is provided with a vertical structure 30 which has a dial 31 on the top thereof. A pointer 32 extending from a knob 33 co-operates with the dial 31 to indicate the distance travelled by the planter between seed hills, or hills of corn. In the embodiment shown this dial is provided with the consecutive numerals from 1 to 40 since this is the number of inches usually between hills of corn. The pointer 32 and the knob 33 are secured to a vertical shaft 34 which is carried by the structure 30. At the end of the vertical shaft 34 there is a bevel gear 35 which engages another bevel gear 36 which is mounted on a horizontal shaft 37. On the other end of the horizontal shaft 37 there is a gear 38 which is arranged to be engaged by a gear 39 mounted upon the axle 11. The gear 39 may be disengaged from gear 38 by a gear shift lever 40 which operates a fork and collar 41 associated with the gear 39. The movement of the gear 39 is limited by a stop collar 42 mounted upon the axle 11. The gear shift lever 40 is supported in a pivotal manner by a supporting structure 43 which is mounted upon the auxiliary frame 29. The gear 38 on the shaft 37 is provided with a crank pin upon which one end of a pitman 44 is mounted. At the other end of the pitman or connecting rod 44 there is a slide and catch member 45 which engages a pin 46 which is carried by a crank or lever 47 mounted upon the seed trip bar 19. At an intermediate point the pitman 44 is provided with a cam surface 48 which intermittently engages a cam actuator roller 49 which is adjustably secured to the transverse subframe 14. The position of the cam roller 49 is determined by the depth at which the seed is planted. Just back of the cam surface 48, the pitman 44 has a U-shaped portion 50 which permits the catch portion 51 of the member 45 to hook the pin 46 of the lever 47 and to draw the lever backward. When the crank on the gear 38 reaches a certain point the cam surface 48 will engage the roller 49 and subsequently the pin 46 will be released from the catch portion 51 of the member 45 and slide forward in the slide portion 52 of this member. The seed bar 19 is so biased that the lever 47 will be moved forward whenever it is not engaged by the catch 51 of the member 45. When the lever 47 is released the seeds in the compartments of the seed boots 16 are released and a hill is planted. The pointer on the dial is so arranged as to indicate the numeral 40 at the time that the seed bar is released by the catch and slide member 45. The knob 33 on the vertical indicator shaft 34 permits manual adjustment of the seed bar actuating mechanism thereby to determine the operation of the planter.

The operation of the planter will now be described to show the co-operation between the various elements. It will be assumed that the operator is to plant corn which generally is planted in hills at forty inch intervals with several kernels of corn in each hill. The operator at the start may determine the first hill of corn by bringing the planter, with the gear 39 disengaged, into position. At the point where the first hill is to be planted, the planter is stopped and the knob 33 of the indicator dial 31 is rotated to the numeral 40, thus actuating the seed trip bar 19. The gear 39 is then shifted into engagement with the gear 38. The proper one of the marker bars 23 is placed into operation, if this has not yet been done. The seed plate shaft 17 is rendered operative and planting is then begun.

When the planter reaches the end of the field, the planter is stopped; the marker 23 is raised and the gear 39 is disengaged. The planter is then turned about for the return trip to plant the next two rows of corn. The planter is brought into position so that the end of the mark made by the marker bar 23 is between the two horizontal scales 26, and the planter is stopped. The other marker bar 23 is then placed into operation. The operator observes the numerals on the scales 26 which are opposite the mark, and also observes the position of the indicator 32 of the dial 31. The reading of the dial is subtracted from 40, and from the remainder the number of the scale 26 is subtracted if the mark is opposite the forward scale portion. If the mark observed on the scale 26 is read from the rear portion of the scale in back of the reference point this number is added to the remainder. In either case the final number obtained is the number at which the pointer or indicator 32 is to be set on the dial 31. When the dial has been set, the gear 39 is shifted to engage the gear 38, whereupon planting proceeds to the other side of the field. There this simple procedure is again carried out.

From this it will be apparent that a planter embodying my invention is simple to operate since it is possible to plant row after row without dismounting from the machine. The check wire is eliminated, thus obviating the necessity of changing the wire from one side of the planter to the other at each end of the field. The elimination of the check wire also eliminates the duplicate actuating means for the trip bar, in addition to the reel, gears, chain, clutch etc., thus making the manufacture of planters more economical.

While I have shown and described my invention in connection with certain specific embodiments, it will, of course be understood that I do not wish to be limited thereto, since it is apparent that modifications may be made in the instrumentalities employed without departing from the spirit and scope of my invention as set forth in the appended claims.

What I claim as new and desire to secure by Letters Patent of the United States is:

1. In a check row planter having a main frame, an axle, a subframe, a pair of seed boots, and means for supplying seed thereto including a trip bar, the combination comprising a pair of markers hingedly mounted on the extremities of said subframe in alignment with said boots for indicating the operative travel of said planter, a pair of scales mounted horizontally on said frame closely adjacent each other and parallel to the longitudinal axis of said planter in the proximity of the ground, said scales each extending in front of and in back of said boots for indicating the position of the planter relative to the end of the mark in the ground made by one of said markers while planting the previous rows, said scales each having a reference point in alignment with said boots and indicia progressing in each direction to the ends of said scale, means operable from said axle including a pitman for actuating said seed trip bar, and means for indicating the travel of the planter between actuations of said bar, and means for setting the relative position of said last means and said pitman in accordance with data obtained by reference to said latter means and said scales.

2. The combination for a check row planter having a main frame mounted upon a pair of wheels and an axle, a transversely arranged subframe carrying a pair of seed boots, and means for supplying seed thereto including a trip bar; comprising a pair of markers hingedly mounted upon the extremities of said subframe in transverse alignment with said seed boots, said markers operating to mark in the ground to indicate the operative distance traveled by said planter; a pair of parallel horizontal scales mounted along the longitudinal center of said planter closely adjacent the ground, said scales extending in front of and in back of said seed boots and said markers, said scales each having a reference point in alignment with said markers and indicia thereon progressing in each direction from said reference point for co-operation with the end of a mark made in the soil by one of said markers; a dial mechanism for indicating the distance of travel of said planter relative to a seed hill at which point said trip bar was actuated, said mechanism being mounted upon said main frame and including a dial and pointer, one of which is actuated by a gear provided with a crank, a second gear mounted upon said axle for selective engagement with said latter gear, a pitman mounted upon said gear crank, said pitman being provided at one end with a catch and slide member and at an intermediate point with a cam surface, a cam actuator adjustably mounted upon said subframe, a lever and pin mounted on said trip bar, said pin co-operating with said slide and catch member to control the actuation of said seed trip bar, and means for manually changing the position of said pitman and said dial mechanism.

3. A check row planter comprising a frame, an axle, a pair of wheels for said axle, a pair of spaced apart seed boots, means for supplying seed thereto including a trip bar, a pair of markers mounted on said frame in transverse alignment with said seed boots, a pair of parallel scales mounted horizontally along the longitudinal center of said planter so as to be closely adjacent the soil under the planter, said scales each having a reference point in alignment with said markers and indicia thereon progressing in each direction from said reference point, a dial mechanism mounted on said frame, a plurality of gears for driving said mechanism, one of said gears being provided with a crank, a gear mounted upon the axle for selective engagement with said latter gear, a pitman mounted upon said gear crank and having a cam portion at an intermediate point and a catch and slide mechanism at one end, a lever and pin connected with the trip bar, said pin co-operating with said catch and slide mechanism.

4. In a check row planter having a frame, an axle, a pair of seed boots, and means for supplying seed thereto including a trip bar, the combination comprising a pair of markers hingedly mounted on said frame in transverse alignment with said seed boots to indicate the distance traveled by said planter, a pair of parallel horizontal scales mounted closely adjacent the ground beneath the planter in alignment with the longitudinal center thereof, said scales each extending ahead of and in back of said planter boots and having a reference point in alignment with said boots, said scales having indicia progressing in each direction from said reference point to the ends of said scales for co-operation with the mark made by said markers, a gear supported by said frame, said gear having a crank, a pitman mounted on said crank and arranged to actuate said trip bar by means of a catch and slide mechanism located at one end of said pitman, a gear mounted on said axle for selective engagement with said gear crank, and indicating mechanism actuated from said first mentioned gear for indicating the distance traveled by said planter from the point of the last actuation of the trip bar.

5. The combination for a check row planter having a frame, an axle, a pair of seed boots, and means for supplying seed thereto including a trip bar, comprising a pair of markers pivotally mounted on said frame in alignment with said boots for indicating the travel of said planter while operating, a pair of parallel horizontal scales mounted closely adjacent the ground beneath the planter in alignment with the longitudinal center thereof, said scales extending ahead of and in back of said planter boots for indicating the position of the planter relative to the mark in the ground made by said marker, a gear supported by said frame, a crank mounted on said gear, selectively operable means for transmitting a driving force from said axle to said gear, a pitman mounted on said crank, said pitman being provided with a catch and slide mechanism and a cam surface, an adjustably positioned cam actuator supported on said planter, means mounted on said trip bar for cooperating with said catch and slide mechanism to control the actuation of said trip bar, means for indicating the position of said pitman relative to the previous actuation of said trip bar, and means for manually adjusting the position of said gear and pitman in accordance with data obtained by reference to said parallel scales.

6. In a check row planter having a main frame, an axle, a transversely arranged subframe, a pair of seed boots mounted thereon, and means for supplying seed thereto including a trip bar, the combination comprising a pair of markers hingedly mounted upon said subframe in alignment therewith for indicating the operative travel of said planter, two closely adjacent horizontal scales each supported from said main frame in the proximity of the ground equidistant from the longitudinal center of the planter so as to extend ahead of and in back of said seed boots whereby said scales may co-operate with the mark in the ground made by one of said markers to indicate the position of the planter relative to said mark, and means operated by said axle for intermittently actuating said seed trip bar, said means including a gear, supported by said frame, said gear having a crank, a pitman mounted on said crank, said pitman having a catch and slide mechanism for actuating said trip bar, means including a gear mounted on said axle for selectively supplying a driving force from said axle to said gear, means for indicating the position of said gear and pitman, and means for manually adjusting the relative position of said gear and pitman in accordance with data obtained by reference to said scales.

7. The combination for a check row planter having a frame, a subframe, a pair of wheels and an axle, a pair of seed boots, and means for supplying seed thereto including a trip bar, comprising a dial mechanism for indicating the travel of said planter and the point at which said trip bar is actuated, said dial mechanism being mounted on said frame and being connected to a gear having a crank, a gear mounted upon said axle for selective engagement with said latter gear, a pitman mounted on said gear crank, said pitman being provided at an intermediate portion with a cam surface and at one end with a catch and slide mechanism, a lever and pin mounted on said trip bar for co-operation with said catch and slide mechanism, a cam actuator adjustably mounted on said subframe and means for manually changing the position of said dial mechanism and said pitman.

FRANCIS F. ARENZ.